ng et al.

(12) United States Patent
Jung et al.

(10) Patent No.: US 12,266,771 B2
(45) Date of Patent: Apr. 1, 2025

(54) METHOD FOR SEPARATING TRANSITION METAL FROM WASTE POSITIVE ELECTRODE MATERIAL

(71) Applicant: LG Chem, Ltd., Seoul (KR)

(72) Inventors: Won Sig Jung, Daejeon (KR); Tae Young Rhee, Daejeon (KR); Hwan Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 793 days.

(21) Appl. No.: 17/608,904

(22) PCT Filed: Dec. 15, 2020

(86) PCT No.: PCT/KR2020/018324
§ 371 (c)(1),
(2) Date: Nov. 4, 2021

(87) PCT Pub. No.: WO2021/125735
PCT Pub. Date: Jun. 24, 2021

(65) Prior Publication Data
US 2022/0320617 A1    Oct. 6, 2022

(30) Foreign Application Priority Data
Dec. 16, 2019    (KR) .................. 10-2019-0168318

(51) Int. Cl.
*H01M 10/54*    (2006.01)
*C01D 15/02*    (2006.01)

(52) U.S. Cl.
CPC ........... *H01M 10/54* (2013.01); *C01D 15/02* (2013.01); *C01P 2002/72* (2013.01)

(58) Field of Classification Search
CPC ..... H01M 10/54; C01D 15/02; C01P 2002/72
USPC ..................................................... 423/179.5
See application file for complete search history.

(56) References Cited

U.S. PATENT DOCUMENTS

| | | | |
|---|---|---|---|
| 5,393,622 A | 2/1995 | Nitta et al. | |
| 2011/0147679 A1 | 6/2011 | Inukai et al. | |
| 2015/0194672 A1 | 7/2015 | Barker et al. | |
| 2017/0187065 A1 | 6/2017 | Inoue et al. | |
| 2021/0147960 A1 | 5/2021 | Rohde et al. | |

FOREIGN PATENT DOCUMENTS

| | | |
|---|---|---|
| CN | 104538696 A | 4/2015 |
| CN | 104953199 A | 9/2015 |
| CN | 106848470 A | 6/2017 |
| CN | 108220607 A | 6/2018 |
| CN | 109742476 A | 5/2019 |
| EP | 3151317 A1 | 4/2017 |
| ID | 201701370 A | 2/2017 |
| JP | 2010-034021 A | 2/2010 |
| JP | 2011-094227 A | 5/2011 |
| JP | 2012229481 A | 11/2012 |
| JP | 2015531143 A | 10/2015 |
| KR | 101049937 B1 | 7/2011 |
| KR | 101271669 B1 | 6/2013 |
| KR | 101497041 B1 | 3/2015 |
| KR | 101497921 B1 | 3/2015 |
| KR | 101623930 B1 | 5/2016 |
| KR | 101883100 B1 | 7/2018 |
| KR | 101911633 B1 | 10/2018 |
| KR | 102008582 B1 | 8/2019 |
| WO | 2019-197192 A1 | 10/2019 |

OTHER PUBLICATIONS

Extended European Search Report including Written Opinion for Application No. 20903703.5 dated Jul. 18, 2022, pp. 1-7.
Search report from International Application No. PCT/KR2020/018324, mailed Mar. 23, 2021.

*Primary Examiner* — Edward M Johnson
(74) *Attorney, Agent, or Firm* — Lerner David LLP

(57) ABSTRACT

A method for separating a transition metal from a waste positive electrode material includes step 1 of preparing a waste positive electrode material represented by Formula 1, step 2 of heat treating the waste positive electrode material in an inert gas atmosphere or an oxygen atmosphere to phase separate the waste positive electrode material into a lithium oxide and a metal oxide, step 3 of cooling an obtained product of step 2 to room temperature in an inert atmosphere, and step 4 of mixing a cooled product cooled to room temperature in step 3 with distilled water, and then filtering the mixture to leach a transition metal.

13 Claims, 2 Drawing Sheets

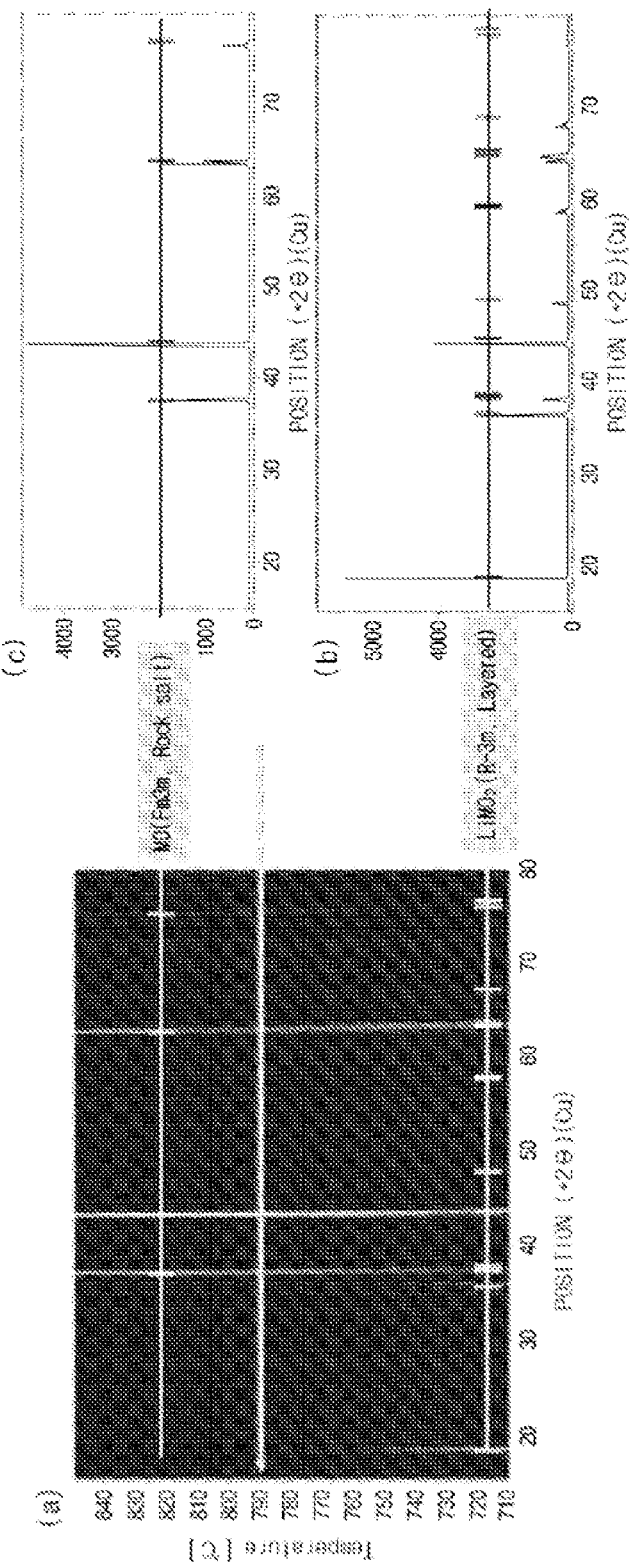
[FIG. 1]

[FIG. 2]
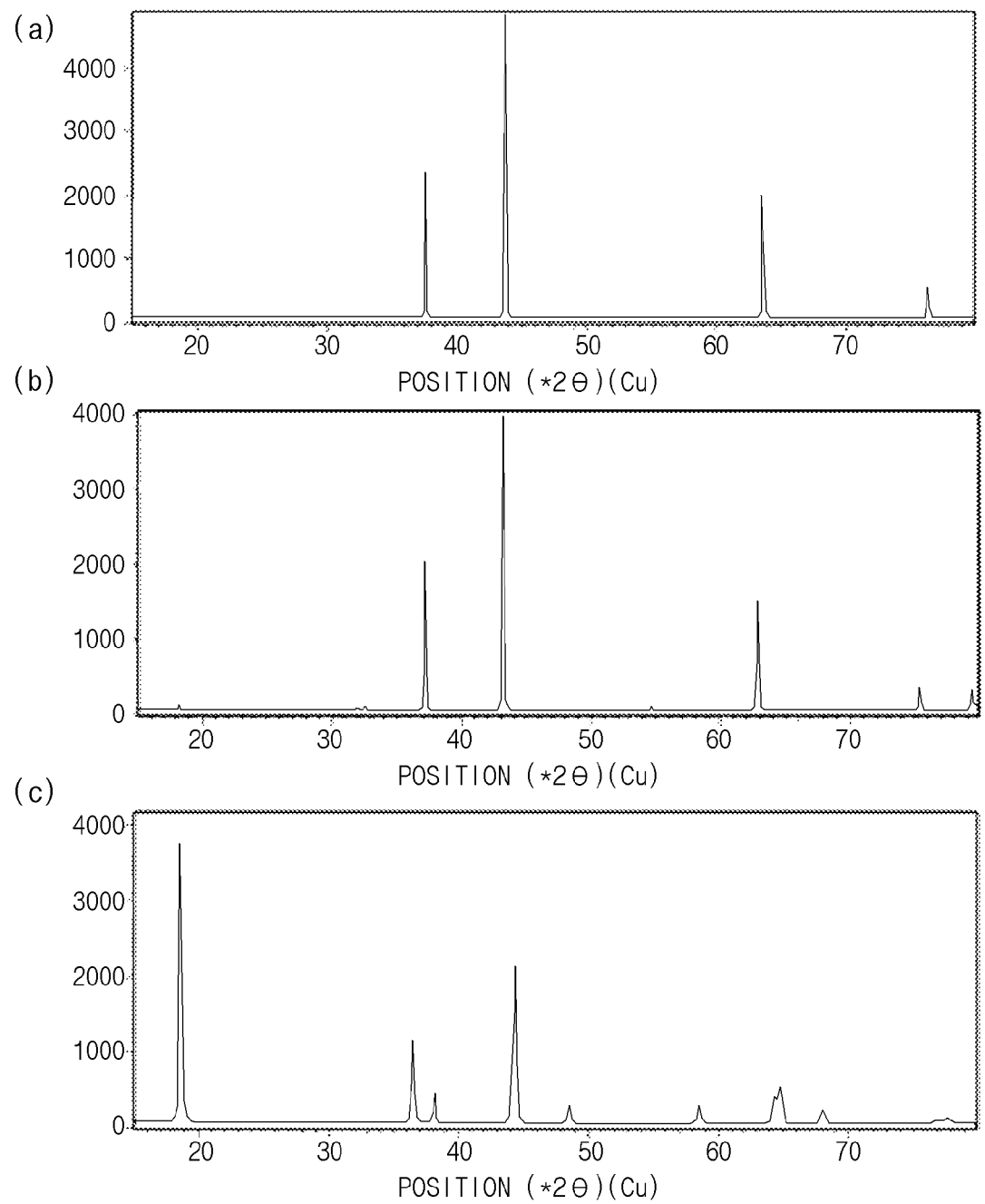

METHOD FOR SEPARATING TRANSITION METAL FROM WASTE POSITIVE ELECTRODE MATERIAL

TECHNICAL FIELD

The present application is a national phase entry under 35 U.S.C. § 371 of International Application No. PCT/KR2020/018324, filed on Dec. 15, 2020, which claims priority from Korean Patent Application No. 10-2019-0168318, filed on Dec. 16, 2019, in the Korean Intellectual Property Office, the disclosures of which are incorporated herein in its entirety by reference.

BACKGROUND ART

A lithium secondary battery is generally composed of a positive electrode including a positive electrode active material, a negative electrode including a negative electrode active material, a separator, and an electrolyte, and is a secondary battery charged and discharged by the intercalation-deintercalation of lithium ions. A lithium secondary battery has advantages of having high energy density, high electromotive force, and high capacity, and thus is applied in various fields.

A positive electrode active material of a lithium secondary battery includes a transition metal, such as nickel, cobalt, manganese, and the like, together with lithium. The nickel and cobalt are metals which are relatively expensive, and in particular, there are limited number of countries producing cobalt, so that cobalt is known as a metal whose supply and demand is unstable worldwide. Therefore, when a transition metal, including the lithium and the cobalt, is recovered from a waste electrode, particularly a positive electrode, and recycled as a raw material, price competitiveness may be ensured, and additional revenue may be generated. Therefore, studies have been conducted on a method for recovering and recycling a metal component from a waste electrode.

Typically, in order to recover a metal component from a waste electrode, a method for extracting a transition metal by dissolving a positive electrode active material in a chemical solvent such as an acid solvent or an organic solvent has been used. However, when a chemical solvent is used as described above, there is a problem of environmental pollution.

Therefore, there is a need for a separation method capable of suppressing an environmental pollution problem when separating a transition metal from a waste positive electrode.

PRIOR ART DOCUMENT (Patent Document 1) Korean Patent Laid-Open Publication No. 1497921

DISCLOSURE OF THE INVENTION

Technical Problem

In order to solve the above problem, a first aspect of the present invention provides a method that can easily separate a transition metal from a waste positive electrode material in a dry manner without the problem of environmental pollution.

Technical Solution

According to an aspect of the present invention, there is provided a method for separating a transition metal from a waste positive electrode material, wherein the method includes Step 1 of preparing a waste positive electrode material represented by Formula 1 below, Step 2 of heat treating the waste positive electrode material in an inert gas atmosphere or an oxygen atmosphere to phase separate the waste positive electrode material into a lithium oxide and a metal oxide, Step 3 of cooling an obtained product of Step 2 to room temperature in an inert atmosphere, and Step 4 of mixing a cooled product cooled to room temperature in Step 3 with distilled water, and then filtering the mixture to leach a transition metal.

$$Li_{1+a}Ni_{1-x}M_xO_2 \qquad \text{[Formula 1]}$$

In Formula 1 above, M is one or more selected from the group consisting of Co, Mn, and Al, $0 \leq a \leq 0.3$, and $0 \leq x \leq 0.5$.

Advantageous Effects

According to the present invention, a transition metal is separated from a waste positive electrode material by a structural change caused by heat treatment, so that environmental pollution problems according to the use of a chemical solvent may be prevented in advance, and the transition metal may be easily separated from the waste positive electrode material.

BRIEF DESCRIPTION OF THE DRAWINGS (a) to (c) of FIG. 1 are graphs showing XRD data representing structural changes according to the temperature of a waste positive electrode material produced in Example 1; and (a) to (c) of FIG. 2 are graphs respectively showing XRD data measured after separating a transition metal from a waste positive electrode material prepared in (a) Example 1, (b) Example 2, and (c) Comparative Example 1.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Method for Separating Transition Metal from Waste Positive Electrode Material

In order to separate a transition metal from a waste positive electrode material according to the present invention, there are included Step 1 of preparing a waste positive electrode material represented by Formula 1 below, Step 2 of heat treating the waste positive electrode material in an inert gas atmosphere or an oxygen atmosphere to phase separate the waste positive electrode material into a lithium oxide and a metal oxide, Step 3 of cooling an obtained product of Step 2 to room temperature in an inert atmosphere, and Step 4 of mixing a cooled product cooled to room temperature in Step 3 with distilled water, and then filtering the mixture to leach a transition metal.

Hereinafter, each step of the present invention will be described in more detail.

First, a waste positive electrode material is prepared (Step 1).

In the present invention, a waste positive electrode material may be obtained from an electrode with defects generated during a manufacturing process of a secondary battery, or may be obtained from an electrode separated from a secondary battery used and then discarded. Specifically, the waste positive electrode material may be, for example, one with coating defects generated during the coating of an electrode active material slurry, or one that do not meet specifications, or may be obtained from an electrode with an expiration date set at the time of storage expired among manufactured electrodes.

Particularly, when a waste positive electrode material is used as in the present invention, benefits from recycling an active material may be greater than when recycling a waste negative electrode material.

For example, the waste positive electrode material according to the present invention may be represented by Formula 1 below, and preferably, nickel may be included in 60 mol % or greater based on a total number of moles of transition metals except for lithium.

$$Li_{1+a}Ni_{1-x}M_xO_2 \quad \text{[Formula 1]}$$

In Formula 1 above, M is one or more selected from the group consisting of Co, Mn, and Al, $0 \leq a \leq 0.3$, and $0 \leq x \leq 0.5$.

Specifically, in Formula 1 above, the M is an element substituted for a Ni site in an oxide represented by Formula 1, and may include one or more selected from the group consisting of Co, Mn, and Al.

1+a represents a molar ratio of lithium in the oxide represented by Formula 1 above, wherein the a may satisfy $0 \leq a \leq 0.3$, preferably $0 \leq a \leq 0.2$.

x represents a molar ratio of a doping element M in the oxide represented by Formula 1 above, wherein the x may satisfy $0 \leq x \leq 0.5$, preferably $0 \leq x \leq 0.4$, more preferably $0 \leq x \leq 0.2$.

1−x represents a molar ratio of nickel in the oxide represented by Formula 1 above, wherein the 1−x may satisfy $0.5 \leq 1-x \leq 1.0$, preferably $0.6 \leq 1-x \leq 1.0$, more preferably $0.8 \leq 1-x \leq 1.0$.

When a nickel-in excess waste positive electrode material containing nickel in excess is used as in the present invention, since nickel, which is expensive, is contained in a large quantity, price competitiveness may be ensured when transition metals are recovered therefrom and recycled as raw materials. In addition, as the need for a high capacity battery for a third-generation electric vehicle or the like increases, it is expected that the use of a nickel-in excess positive electrode material rapidly increases, so that it is important to secure a technology for processing a nickel-in excess waste positive electrode material.

Next, the waste positive electrode material is heat treated in an inert gas atmosphere or an oxygen atmosphere to phase separate the waste positive electrode material into a lithium oxide and a metal oxide (Step 2).

As in the present invention, when the waste positive electrode material is heat treated above a temperature range (700 to 800° C.) in which a layered structure is stable, due to the destabilization of the layered structure, the waste positive electrode material is phase separated into phases where the phase of a lithium oxide and the phase of a metal oxide are each stable at a high temperature, that is, the phases of the lithium oxide and the metal oxide. For example, the positive electrode material is in a stable phase form when having a layered structure at 600° C. to 800° C., and when heat treating is performed at 800° C. or higher, the positive electrode material is in a stable phase form when separated into a lithium oxide and a metal oxide. In addition, the higher the heat treatment temperature during the phase separation, the higher the purity of a separation rate.

According to the present invention, the heat treating of the waste positive electrode material may be performed in an inert gas atmosphere or an oxygen atmosphere, and for example, may be performed in an inert gas atmosphere, the inert gas being such as nitrogen, argon, helium or neon, or in an oxygen atmosphere having an oxygen concentration of 100 mol % or less.

For example, when the heat treating is performed in an oxygen atmosphere, the heat treating may be performed at 900° C. or higher, preferably 900° C. to 1,000° C. Therefore, when the heat treating is performed in the above-described temperature range, a stable phase tends to be formed, so that a lithium transition metal oxide may be easily phase separated. However, when the heat treatment temperature is lower than the above range, a layered structure remains, so that separation efficiently may decrease, and when higher than the above range, process efficiency may decrease.

Particularly, the lower the partial pressure of oxygen, wherein the oxygen concentration is 100 mol % or less, preferably 50% or less, more preferably 0 mol % to 10 mol %, the easier the phase separation of a lithium transition metal oxide. However, even in an oxygen atmosphere of 100 mol %, phase separation is possible in the above-described heat treatment temperature range.

For example, when the heat treating is performed in an inert gas atmosphere, the heat treating may be performed at 800° C. or higher, preferably 800° C. to 950° C.

When the heat treating is performed in an inert gas atmosphere, a reducing atmosphere is maintained to lower a temperature at which phases of a lithium oxide and a metal oxide are separated, so that even when the heat treatment temperature is relatively low, the phase separation of a lithium transition metal oxide may easily occur.

In addition, according to the present invention, when the heat treating is performed in the inert gas atmosphere, hydrogen gas may be further included. Preferably, hydrogen gas in an amount of 10 vol % or less, preferably 2 to 5 vol % based on 100 vol % of an inert gas may be further included.

When the heat treating is performed in the inert gas atmosphere, and when hydrogen gas is further included, the temperature at which the phases of the lithium oxide and the metal oxide are separated is further lowered due to reducing power of the hydrogen gas, so that even when the heat treatment temperature is relatively low, an effect of easily phase separate the lithium transition metal oxide may be further achieved.

Next, an obtained product of Step 2 is cooled to room temperature in an inert atmosphere (Step 3).

When cooling a waste positive electrode material heat treated as in the present invention, the cooling is performed in an inert atmosphere, so that the waste positive electrode material is prevented from being transitioned back to having a layered structure during temperature lowering. Through the above, cooling to room temperature may be achieved while phases separated in Step 2 are maintained. For example, if the cooling is performed in an oxygen atmosphere, when the temperature of the waste positive electrode material passes an interval of 600 to 800° C. during temperature lowering, the waste positive electrode material may be transitioned back to having a layered structure due to recrystallization of the positive electrode material.

For example, a temperature lowering rate when cooling the waste positive electrode material may be 1° C./min to 10° C./min. When the temperature lowering rate is lower than the above range, as time passing through a layered structure generation interval, which is 600 to 800° C., increases, a phase separation rate may be lowered, and also, process time increases, so that process efficiency may decrease. On the other hand, when the temperature lowering rate is higher than the above range, equipment is strained, so that process cost may increase due to the reduction in equipment life, and the like.

Lastly, a mixed solution in which a cooled product obtained in Step 3 and distilled water are mixed is subjected to filtering to leach a transition metal.

For example, the cooled product obtained in Step 3 and the distilled water may be mixed at a weight ratio of 1:0.3 to 1:2, preferably 1:0.5 to 1:1.2, to leach the lithium oxide and the metal oxide phase separated in Step 2 in the distilled water.

For example, the leaching of a transition metal in the distilled water may be performed for 5 to 20 minutes at a temperature of 10 to 50° C. When leaching time is as short as less than the above range, a transition metal is not sufficiently leached in distilled water, and when leaching time exceeds the above range, a leached amount may increase, but a process is lengthened, so that economic feasibility may lowered. In addition, when a leaching temperature satisfies the above range, leaching efficiency may further increase, but the present invention is not limited thereto.

Next, the distilled water is filtered to obtain each of a lithium oxide and a metal oxide leached in the distilled water.

The filtering may be performed by a method in which the mixed solution is passed through a filter having micro-pores to filter out floating matters and impurities in the mixed solution, and may preferably be performed by a method in which a leachate is subjected to decompression filtration using a filter connected to a vacuum pump, and the like, or by a method in which the mixed solution is filtered using a filter paper having micro-pores.

The transition metal leached after Step 4 may include, for example, a lithium compound including a lithium hydroxide formed by a reaction between the lithium oxide separated in Step 2 and the distilled water, and a nickel metal oxide including nickel and M, specifically a metal oxide in the form of $Ni_{1-x}M_xO$ (at this time, $0 \leq x \leq 0.5$).

Meanwhile, it is most preferable that the metal oxide is leached as a metal oxide in the form of $Ni_{1-x}M_xO$ (where, $0 \leq x \leq 0.5$). However, the metal oxide may be leached in the form of $Li_{x2}Ni_{1-x1-x2}M_{x1}O$ (where, $0 \leq x1 \leq 0.2$, $0 \leq x2 \leq 0.3$, and $x=x1+x2$) in which a portion of nickel is substituted with lithium. When a metal oxide in the form in which a portion of nickel is substituted with lithium is leached, Step 1 to Step 4 of the present invention may be repeatedly performed to further increase separation purity between a lithium oxide and a metal oxide.

For example, the separation purity of a metal oxide may be determined through the size of a unit cell measured by inductively coupled plasma (ICP) or XRD. Step 1 to Step 4 may be repeatedly performed once to 4 times to obtain a target separation purity.

For example, the separation purity of a metal oxide may be determined by the concentration of Li measured by the ICP. Alternatively, when the size of a unit cell measured by XRD is 0.42 nm to 0.4165 nm, it can be determined that purity is 80% or greater. On the other hand, when the size of a unit cell measured by XRD is less than the above range, it means that lithium is substituted in a nickel site, so that it can be determined that separation purity is less than 80%, which is lower, and when the size exceeds the above range, it can be determined that phases other than the metal oxide may co-exist.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

A waste positive electrode material including $LiNi_{0.9}Co_{0.05}Mn_{0.05}O_2$ as a positive electrode active material was prepared (Step 1). The waste positive electrode material was heat treated at 850° C. in a nitrogen atmosphere to separate the phase of the waste positive electrode material into $Li_2O$ and $Ni_{0.9}Co_{0.05}Mn_{0.05}O$ (Step 2).

Thereafter, the phase-separated waste positive electrode material was cooled to room temperature in a nitrogen atmosphere (Step 3).

Next, an obtained cooled product was mixed with distilled water at a weight ratio of 1:0.8 to be washed, and was subjected to vacuum filtration using a filter made of polyvinylidene fluoride and having a pore of 0.5 μm. Thereafter, a filtered solid and an aqueous solution were subjected to vacuum filtration to be separated in the form of a lithium oxide (LiOH) and a metal oxide ($Ni_{0.9}Co_{0.05}Mn_{0.05}O$) (Step 4).

Example 2

Transition metals were separated in the form of the lithium oxide (LiOH) and the metal oxide ($Ni_{0.9}Co_{0.05}Mn_{0.05}O$) from the waste positive electrode material in the same manner as in Example 1 except that the waste positive electrode material was heat treated at 950° C. in an atmospheric atmosphere.

Example 3

Transition metals were separated in the form of the lithium oxide (LiOH) and the metal oxide ($Ni_{0.9}Co_{0.05}Mn_{0.05}O$) from the waste positive electrode material in the same manner as in Example 1 except that Step 1 to Step 4 were repeatedly performed 4 times.

Comparative Example 1

Transition metals were separated in the form of the lithium oxide (LiOH) and the metal oxide ($Ni_{0.9}Co_{0.05}Mn_{0.05}O$) from the waste positive electrode material in the same manner as in Example 1 except that the phase-separated waste positive electrode material was cooled to room temperature in an oxygen atmosphere.

Comparative Example 2

Transition metals were separated in the form of the lithium oxide (LiOH) and the metal oxide ($Ni_{0.9}Co_{0.05}Mn_{0.05}O$) from the waste positive electrode material in the same manner as in Example 1 except that the heat treating was performed at 750° C.

Comparative Example 3

Transition metals were separated in the form of the lithium oxide (LiOH) and the metal oxide ($Ni_{0.9}Co_{0.05}Mn_{0.05}O$) from the waste positive electrode material in the same manner as in Example 1 except that the heat treating was performed at 850° C. in an oxygen atmosphere.

Experimental Example 1

In order to identify phase separation properties of the waste positive electrode material of Example 1, the temperature was raised from 700° C. to 830° C. during the heat treating of the waste positive electrode material of Example 1, and changes in the phase of the positive electrode material at the time were observed.

Specifically, the temperature of the waste positive electrode material of Example 1 was raised in a nitrogen (>99%) atmosphere, and in situ thermal XRD data at the time was identified using Empyrean XRD equipment of Panalytical Co., Ltd.

As shown in (a) and (b) of FIG. 1, it can be confirmed that the waste positive electrode material prepared in Example 1 had a phase of a lithium transition metal oxide ($LiMO_2$, R-3m, layered structure) at 710° C. However, when looking at (a) and (c) of FIG. 1, it can be confirmed that the same had a phase of a metal oxide (MO, Fm3m, rock-salt structure) at 790° C. or higher, specifically around 820° C. As a result, it can be seen that the lithium transition metal oxide was decomposed at 790° C. or higher and converted into a metal oxide/lithium oxide phase.

Experimental Example 2

Changes in the phase of the waste positive electrode material after the heat treating and the cooling to room temperature in each of Examples 1 and 2 and Comparative Example 1 were observed.

Specifically, the waste positive electrode material was prepared and then cooled after the phase separation in each Examples 1 and 2 and Comparative Example 1, and in situ thermal XRD data at the time was identified using the Empyrean XRD equipment of Panalytical Co., Ltd, and is shown in (a) to (c) of FIG. 2.

FIG. 2 are graphs respectively showing the in situ thermal XRD data of the waste positive electrode material prepared and then cooled after the phase separation in (a) Example 1, (b) Example 2, and (c) Comparative Example 1.

Looking at (a) and (b) of FIG. 2, it can confirmed that even through the waste positive electrode material is heated and then cooled by the method of each of Examples 1 and 2, (c) of FIG. 1, that is, the metal oxide (MO, Fm3m, rock-salt structure) phase is maintained.

On the other hand, looking at (c) of FIG. 2, when the waste positive electrode material is heated and then cooled by the method of Comparative Example 1, (b) of FIG. 1, that is, the lithium transition metal oxide ($LiMO_2$, R-3m, layered structure) phase is regenerated.

Experimental Example 3

In order to identify the separation purity of the transition metals separated in each of Examples 1 to 3 and Comparative Examples 2 to 3, the size of a unit cell at the time was identified using the Empyrean XRD equipment of Panalytical Co., Ltd, and the sizes are shown in Table 1 below.

TABLE 1

| | Unit cell size (nm) |
|---|---|
| Example 1 | 0.4187 |
| Example 2 | 0.4185 |
| Example 3 | 0.4195 |
| Comparative Example 2 | 0.4134 |
| Comparative Example 3 | 0.4125 |

The transition metals separated in each of Examples 1 to 3 had the size of a unit cell measured by XRD in the range of 0.42 nm to 0.4165 nm, so that it can be confirmed that the purity thereof is 80% or higher. On the other hand, the transition metals separated in each of Comparative Examples 2 and 3 had the size of a unit cell measured by XRD in a range less than the range of the present invention, so that it can be confirmed that the purity thereof is lower than that of the transition metals separated in each of Examples 1 to 3.

The invention claimed is:

1. A method for separating a transition metal from a waste positive electrode material, the method comprising:
    step 1 of preparing a waste positive electrode material represented by Formula 1 below;
    step 2 of heat treating the waste positive electrode material in an inert gas atmosphere or an oxygen atmosphere to phase separate the waste positive electrode material into a lithium oxide and a metal oxide to form an obtained product;
    step 3 of cooling the obtained product of the step 2 to room temperature in an inert atmosphere to form a cooled product; and
    step 4 of mixing the cooled product cooled to room temperature in the step 3 with distilled water to form a mixture, and then filtering the mixture to leach a transition metal:

$$Li_{1+a}Ni_{1-x}M_xO_2 \qquad \text{[Formula 1]}$$

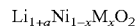

wherein in Formula 1 above,
    M is one or more selected from the group consisting of Co, Mn, and Al, and 0≤a≤0.3, and 0≤x≤0.5.

2. The method of claim 1, wherein in the step 2, the heat treating is performed at 900° C. or higher in an oxygen atmosphere.

3. The method of claim 2, wherein the heat treating is performed at 900°° C. to 1,000° C. in the oxygen atmosphere.

4. The method of claim 1, wherein in the step 2, the heat treating is performed at 800° C. or higher in an inert gas atmosphere.

5. The method of claim 4, wherein the heat treating is performed at 800° C. to 950°° C. in the inert gas atmosphere.

6. The method of claim 4, wherein the inert gas atmosphere of the step 2further contains hydrogen gas in an amount of 10 vol % or less based on 100 vol % of an inert gas.

7. The method of claim 1, wherein the waste positive electrode material of the step 1 contains nickel in 80 mol % or greater based on a total number of moles of transition metals except for lithium.

8. The method of claim 1, wherein during the cooling of the step 3, a temperature lowering rate is 1° C./min to 10° C./min.

9. The method of claim 1, wherein in the step 4, the cooled product and the distilled water are mixed at 1:0.3 to 1:2.

10. The method of claim 1, wherein the transition metal leached in the step 4 is in the form of a lithium compound including a lithium hydroxide formed by a reaction of the lithium oxide and the distilled water.

11. The method of claim 1, wherein the transition metal leached in the step 4 is in the form of a nickel metal oxide including nickel and M, wherein the M is one or more selected from the group consisting of Co, Mn, and Al.

12. The method of claim 1, wherein the step 1 to the step 4 are repeatedly performed once to 4 times.

13. The method of claim 1, wherein when the size of a unit cell obtained by measuring the transition metal separated in Step 4 by XRD is 0.42 nm to 0.4165 nm, the transition metal is determined to have purity of 80% or greater.

* * * * *